Oct. 4, 1955 M. KARNAUGH 2,719,961

ELECTRICAL CIRCUIT EMPLOYING MAGNETIC CORES

Filed April 27, 1954 2 Sheets-Sheet 1

INVENTOR
M. KARNAUGH
BY
James W. Falk
ATTORNEY

Oct. 4, 1955 M. KARNAUGH 2,719,961

ELECTRICAL CIRCUIT EMPLOYING MAGNETIC CORES

Filed April 27, 1954 2 Sheets-Sheet 2

INVENTOR
M. KARNAUGH
BY [signature]
ATTORNEY

United States Patent Office 2,719,961 Patented Oct. 4, 1955

2,719,961

ELECTRICAL CIRCUIT EMPLOYING MAGNETIC CORES

Maurice Karnaugh, New Providence, N. J., assignor to Bell Telephone Laboratories, Incorporated, New York, N. Y., a corporation of New York Application April 27, 1954, Serial No. 425,845

16 Claims. (Cl. 340—166)

This invention relates to electrical circuits and more particularly to electrical circuits employing magnetic cores.

In many types of electrical circuits there arises a generalized switching problem in which it is desired to switch a current pulse to one of a number of possible loads, the particular load being determined by information priorly stored either in the circuit or associated circuits. Various types of circuits have been developed to resolve this problem including, for example, gas tube, vacuum tube and diode circuits.

Another circuit element which has properties that make it advantageous for utilization in a pulse switching circuit is a magnetic core having a substantially rectangular hysteresis loop. One type of pulse switching circuit utilizing magnetic cores is disclosed in my application Serial No. 393,399, filed November 23, 1953. This type of circuit comprises a plurality of magnetic cores, each having a plurality of windings thereon, including an input winding, an activating winding and an output winding. The activating windings are connected in series to an activating pulse source. The ouput windings are connected in an output network containing a plurality of electrical paths, one end of the network being connected to the last of the series activating windings. A core is said to be set when its magnetization is determined in one direction, and is said to be reset when its magnetization is switched to the other direction. Each core in the network is either set by pulses in its input windings or else remains in the reset condition, according to the applied input information. Then, on application of the activating pulse to the activating windings, which has the effect of resetting those cores which have been priorly set, a blocking electromotive force is induced in each of the output windings of those cores which have been priorly set. The presence of an output winding having such a blocking electromotive force in any of the electrical output paths prevents the activating current from flowing through that path. The circuit may advantageously be so constructed that all paths but one are blocked. In this manner, an output pulse appears only at the load connected to an unblocked path.

It is an object of this invention to provide improved pulse switching circuits employing magnetic cores.

It is another object of this invention to reduce the power requirement of magnetic core switching circuits and more specifically, to reduce the input and activating pulse power required by such circuits.

In accordance with one aspect of this invention, each of the output windings of the magnetic cores is wound on the core so that a forward electromotive force is induced thereacross on application of the activating current to a priorly set core. The output network is so constructed that all cores which are set by any possible combination of input pulses will have output windings which lie on a single output path. Then, on application of the activating pulse, this current will flow only through that path to the exclusion of all others. Thus, only cores lying on a single path need be set and then reset in a single cycle of operation of this circuit. Unidirectional current elements are advantageously connected in each of the output paths in such a manner as to prevent undesirable induced currents from flowing when any of the cores are set or reset. Thus, only the applied activating pulse flows in the output network and to the desired load. Further, a unidirectional current element is advantageously connected in parallel with the output network so that the activating current is shunted through this element to ground after the priorly set cores have been reset or in the case when no cores have been priorly set.

A forward electromotive force is developed across the output winding of a given priorly set core by the activating current pulse as explained above. The current flowing in the output winding tends to oppose the neecssary resetting of the core by the activating winding. As the resetting of the core is required to induce the forward electromotive force in the output winding of the priorly set core, and thus to give rise to the selective switching operation of the circuit, it is necessary that the magnetomotive force tending to reset the core be larger than the magnetomotive force tending to set the core, so that there will be a net magnetomotive force which causes the core to be reset and the pulse switching to occur in accordance with this invention. Because the current through both the activating winding and the output winding of a priorly set core is substantially the same, this net magnetomotive force may most advantageously be attained by providing the activating winding with more turns than the output winding.

In one specific embodiment of this invention, a number of cores are connected in a pulse switching circuit with input windings which determine what output load is to be selected. In another specific illustrative embodiment of this invention, a number of cores are connected in a sequential circuit, the activating windings and output windings of alternate cores being connected to alternate phase activating pulse sources, and the output winding of each core being connected to an output terminal through an input winding of the next core.

It is a feature of this invention that an electrical circuit comprise a number of magnetic cores each having input, activating and output windings, the activating windings being connected in series and the output windings being connected in an output winding network defining a plurality of paths connected to the last of the activating windings, the output windings being wound on their cores so that a forward electromotive force is induced thereacross on resetting of the cores.

It is a further feature of this invention that a pulse switching circuit comprise magnetic cores having their output windings so wound as to develop forward electromotive forces thereacross on resetting of the cores, the input pulses being applied to the input windings of these cores so as to set only the cores at whose output windings an output pulse is desired.

It is another feature of this invention that a unidirectional current element be shunted across the output network to ground to prevent current from flowing through any part of the output network except when priorly set cores are being reset. Thus it is a feature of this invention that a unidirectional current element be shunted across the output winding network to prevent spurious output pulses after the priorly set core or cover has been reset by the activating pulse.

It is another feature of this invention that the activating windings have more turns than the output windings so that there is attained a net magnetomotive force sufficient to reset the cores, induce the forward electromotive force in the output windings of the set cores, and obtain the desired switching of the activating pulse through a particular output winding path to the desired output load.

It is a feature of one specific illustrative embodiment of this invention that two alternate phase activating pulse sources be connected to alternate activating and output windings, the output windings of each core being connected to an output terminal through an input winding of the succeeding core whereby a sequential circuit is attained.

A complete understanding of this invention and of these and other features thereof may be gained from consideration of the following detailed description and the accompanying drawing, in which.

Figure 1:
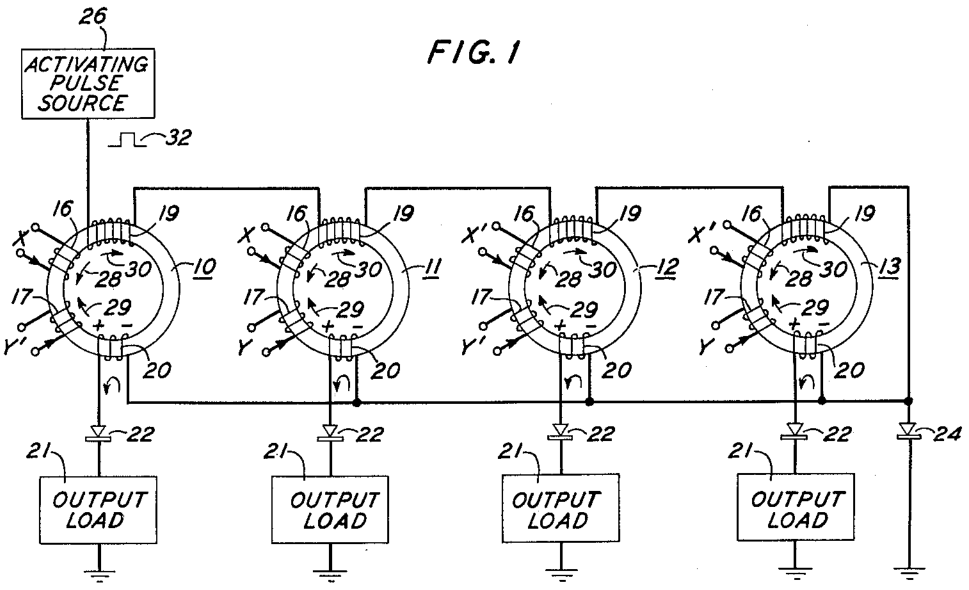
Fig. 1 is a schematic representation of a pulse switching circuit in accordance with one specific illustrative embodiment of this invention.

Turning now to Fig. 1, the embodiment of this invention there depicted comprises four magnetic cores 10, 11, 12, and 13 each being of a material having a substantially rectangular hysteresis loop. Such materials are known in the art and may include certain ferrites, such as the General Ceramics $S_1$, $S_2$ or $S_3$ Ferramic materials, Deltamax, a grain oriented 50 per cent nickel iron alloy of the Allegheny Ludlum Steel Company, 4–79 molybdenum permalloy, supermalloy, and other materials. A plurality of windings are placed on each core including a pair of input windings 16, 17, an activating winding 19, and an output winding 20. An output load 21 is connected to each of the output windings 20 through a unidirectional current element, such as a diode 22. These diodes prevent a current from flowing in the output winding when the core is being set and also prevent current flowing through other output windings when a forward electromotive force is being induced in a particular output winding. In general it can be stated that it is desirable in circuits in accordance with this invention that there be no possible loops for induced currents of any kind, the current flowing through the output windings being the activating current pulse, as described further below.

The activating windings 19 are connected in series with an activating pulse source 26 and the paralleled combination of the output windings 20 and another unidirectional current element or diode 24, which is connected directly to ground.

An appreciation of various of the novel features of this invention can be gained from a description of the operation of this particular embodiment thereof which is a pulse switching circuit for delivering an output pulse to particular output loads 21 depending on the values of the input variables X and Y applied to the input windings 16 and 17, respectively. A variable may have a value equal to either "0" or "1" and the prime of the variable will have the complementary value. An input winding that corresponds to a given variable or primed variable will receive a current pulse during the input phase of the circuit if and only if that variable or primed variable has the value equal to "1." Further the input windings 16 and 17 have been wound on the cores 10, 11, 12, and 13 in opposite directions so that a pulse through a winding 16 tends to set the core by magnetizing the core in a counter-clockwise direction, as indicated by the arrows 28, and a pulse through a winding 17 tends to oppose setting the core by magnetizing the core in a clockwise direction, as indicated by the arrows 29. Each of the activating windings is wound on the core so that the activating current resets the cores, i. e., magnetizes the cores in a clockwise direction, as indicated by the arrows 30. Additionally to facilitate comprehension of this invention and the operation of circuits in accordance with aspects of the invention all input pulses have been assumed to be positive and the direction of flow of the input pulses through the input windings indicated by the arrow adjacent one terminal of each input winding.

In accordance with an aspect of this invention each of the output windings 20 is wound on the magnetic core so that the electromotive force developed thereacross on application of the activating pulse, if the core had priorly been set by the application of the appropriate input variables to the input windings, is in a forward direction, i. e., in the direction of the activating current. This induced electromotive force therefore serves to draw the activating current through the output winding.

Thus if an output pulse is to be switched to the load 21 connected to the output winding 20 of core 11, the appropriate values of the input variables are $X=1$ and $Y=0$. Core 10 will not be set by these inputs as an input pulse through the winding 17 of that core will counterbalance the input pulse through the winding 16, only the input pulse through the windings 16 being in the proper direction to set the core. As $X=1$ and $X'=0$, no input pulses will be applied to the windings 16 of cores 12 and 13 and therefore these cores will not be set. However, an input pulse will be applied to winding 16 of core 11 and, as $Y=0$, no input pulse will be applied to the winding 17 of that core. The application of the input variables to the circuit will therefore leave only core 11 magnetized in a counterclockwise direction, in which direction the core has been set.

Now on application of the activating pulse 32 from the pulse source 26 through each of the windings 19, only core 11 will be reset; thus only in core 11 will there be a change of flux sufficient to induce a substantial electromotive force across the output winding 20 of that core, the electromotive force for a positive pulse 32 being of the polarity indicated in the drawing. This forward electromotive force serves to draw the activating current pulse 32 through the winding 20 of core 11 in preference to the other output windings of the circuit.

Diodes 22 prevent current from flowing through the load circuits 21 of the other cores due to the induced electromotive force across the output winding 20 of core 11 or due to the application of the input pulses. Diode 24, which is directly connected to ground potential, assures that the activating pulse current will flow through this diode rather than any of the output windings and loads after the priorly set core has been reset. The activating pulse current therefore flows through the output winding of the set core only while the core is being reset and thus only while a forward electromotive force is being induced across it.

The activating windings 19 advantageously have more turns than the output windings 20. Because the output windings 20 are wound on the core to develop a forward electromotive force thereacross on resetting of the core, as described above, the activating pulse current flowing through the output winding creates a magnetomotive force tending to set the core, i. e., opposing the resetting of the core by the magnetomotive force developed by the current flowing through the activating winding 19. In order to properly carry out the pulse switching operation, it is necessary that the net electromotive force in the core be sufficient to reset the core. This may advantageously be attained by providing that the activating windings 19 have a sufficiently larger number of turns than the output windings 20, as the same current flows through the activating winding and the output winding of the priorly set core.

It is therefore apparent that in magnetic core circuits in accordance with this invention only one core need be set, by appropriate input pulses, and then reset, by the activating pulse, in order to switch the pulse to an output circuit. Accordingly less power, both for the input pulses and the activating pulse, is required. A pulse switching circuit of the type depicted in Fig. 1 can readily be expanded to include any number of cores and output loads without increasing the power requirements of the circuit; thus this circuit may be generalized to *n* variables utilizing $2^n$ cores, $2^n$ diodes 22, and $2^n$ output loads 21.

Figure 2:
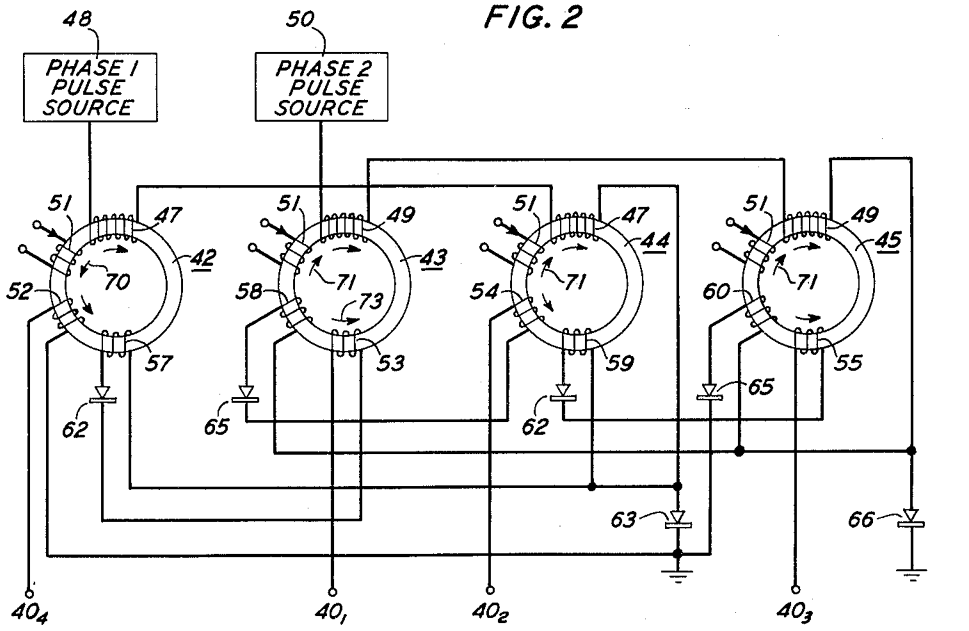
Fig. 2 is a schematic representation of a pulse sequential circuit in accordance with another specific illustrative embodiment of this invention.

Fig. 2 depicts another specific illustrative embodiment of this invention wherein magnetic core circuits in accordance with this invention are employed in a sequential switch. The particular sequential switch depicted has a cycle of four, an output pulse appearing in sequence on terminals $40_1$, $40_2$, $40_3$ and $40_4$. Such a switch may be employed as a pulse frequency divider or for sequential access to a memory, it being understood that it is not limited to any particular cycle.

The circuit comprises four magnetic cores 42, 43, 44, and 45. Cores 42 and 44 each have an activating winding 47 thereon connected to a phase 1 activating pulse source 48; cores 43 and 45 similarly each have an activating winding 49 thereon connected to a phase 2 activating pulse source 50. Each core has an input winding 51 utilized to determine the initial state of the cores at the start of the cycling operation and a second input winding, designated 52, 53, 54, and 55 on the respective cores, utilized to set the core during the cycling operation of the circuit, as described below. The output windings 57 and 59, of cores 42 and 44, respectively, are connected in parallel and to the phase 1 pulse source 48 through the activating windings 47, a diode 62 being in series with each of the output windings 57 and 59 and a diode 63 being connected in parallel therewith and to ground potential, as described above. Similarly the output windings 58 and 60, of cores 43 and 45, respectively, are connected in parallel and to the phase 2 pulse source 50 through the activating windings 49, a diode 65 being in series with each of the output windings 58 and 60 and a diode 66 being connected in parallel therewith and to ground potential.

In the initial state of this circuit only the first core 42 is set; this may be attained by applying a current pulse to the windings 51. This will cause core 42 to be set and cores 43, 44, 45 to be reset, as indicated by the arrows. When the first phase 1 activating pulse is applied to the activating windings 47 in series and output windings 57 and 59 in parallel, a forward electromotive force will be induced in output winding 57 causing the activating pulse current to flow through it and through the diode 62 to the input winding 53, connected thereto. This current causes the core 43 to be set by being magnetized in the direction indicated by arrow 73. Upon passing through the input winding 53 the pulse appears as a time 1 pulse on terminal $40_1$.

At the end of the first time interval of the cycle therefore core 42 has been reset, core 43 is now set, and cores 44 and 45 are still in their initial reset condition; additionally an output pulse has appeared at the first terminal $40_1$.

The activating pulse from the phase 2 pulse source 50 is now applied to the activating windings 49 in series and the parallel output windings 58 and 60 and diode 66. This activating current pulse induces a forward electromotive force in winding 58 of the set core 43 causing the current to flow through the winding 58, diode 65, and input winding 54 connected thereto, to the output terminal $40_2$, thereby setting the third core 44 and resetting the second core 43. In a similar manner the input winding 55 of core 45 is connected to the output winding 59 of core 44 and the input winding 52 of core 42 to the output winding 60 of core 45. Thus each time the next core in the chain is set on application of the alternate phase activating pulse by the output pulse of the prior core.

Circuits in accordance with this invention may be utilized as sequence circuits for any even number of outputs and may also be utilized as ring counters. By using three phases of activating pulses, the number of outputs may be made a multiple of three, so that some odd numbers of outputs may be obtained.

Figure 3:
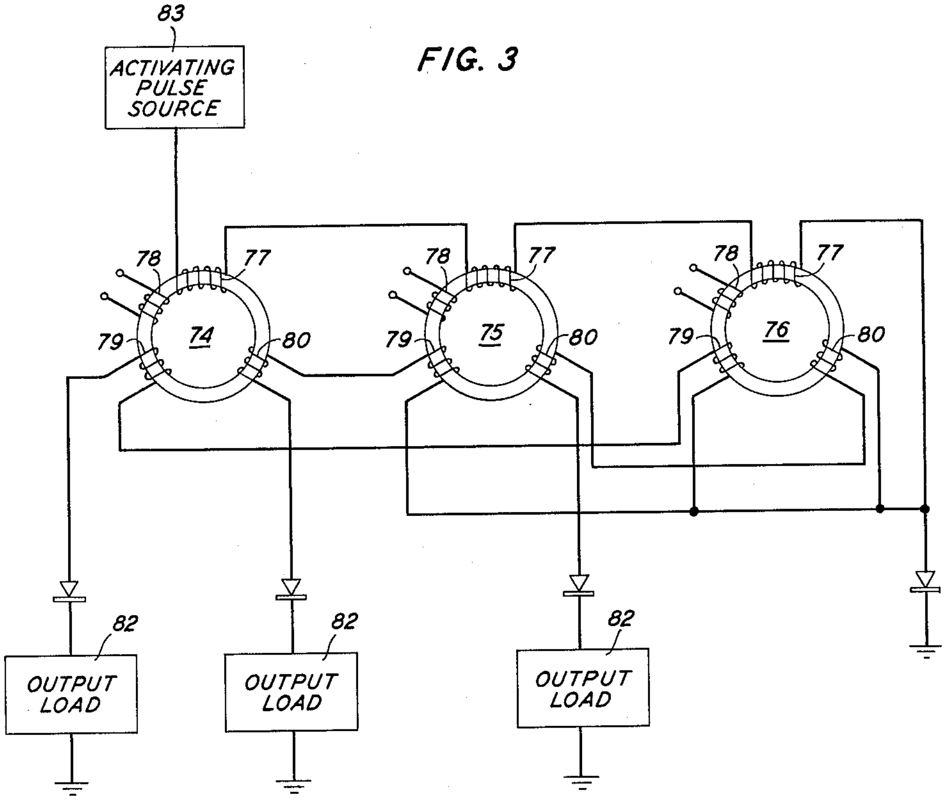
Fig. 3 is a schematic representation of another specific illustrative embodiment of the invention.

Turning now to Fig. 3 there is depicted a circuit in accordance with aspects of this invention in which the output winding network comprises a plurality of paths each including more than one output winding of a core. In this embodiment the number of output windings in each path is the same and the paths are in parallel, but in other specific embodiments the number of windings in each path need not be the same and paths may include common output windings. In this circuit the three cores 74, 75, and 76 each have an activating winding 77, a single input winding 78 and a pair of output windings 79 and 80. The output windings are connected into three paths each including two windings on two different cores so that when the cores have been set by application of input pulses to any two of the input windings 78, an output pulse flows through but a single path in the network to one of the three output loads 82 on application of the activating pulse from the source 83. The output pulse thus flows only in the network path including output windings of each of the priorly set cores.

It is to be understood that the above described arrangements are illustrative of the application of the principles of the invention. Numerous other arrangements may be devised by those skilled in the art without departing from the spirit and scope of the invention.

What is claimed is:

1. An electrical circuit comprising a plurality of magnetic cores, each having an initial direction of magnetization, an input winding, an activating winding and an output winding on each of said cores, said activating winding having a larger number of turns than said output winding, said activating windings being connected in series and said output windings being combined in an output network having a plurality of paths, one end of each of said paths being connected to the last of said series activating windings; load means connected to each of said paths; and means for applying a current pulse to the load means connected to one of said electrical paths of said output network, including means including said input windings on particular cores having an output winding in said one electrical path to reverse the direction of magnetization of said particular cores and means for applying an activating pulse to said series connected activating windings to restore the magnetization of said particular cores to said initial direction, said output windings being wound on said cores so as to develop a forward electromotive force thereacross on the restoration of said direction of magnetization whereby said activating pulse flows through said output windings of said particular cores in said one path.

2. An electrical circuit comprising a plurality of magnetic cores each having an initial direction of magnetization, an input, an activating and an output winding on each of said cores, said activating winding having a larger number of turns than said output winding, said activating windings being connected in series and one end of each of said output windings being connected to the last of said series activating windings; load means connected to each of said output windings; and means for applying a current pulse to the load means connected to the output winding of a particular core including means including an input winding of said particular core to reverse the direction of magnetization of said particular core and means for applying an activating pulse to said series connected activating windings to restore the magnetization of said particular core to said initial direction, said output winding being wound on said core to develop a forward electromotive force thereacross on the restoration of said direction of magnetization whereby said activating pulse flows through said output winding of said particular core to said load means.

3. An electrical circuit comprising a plurality of magnetic cores; a plurality of windings on each of said cores, said windings including an input winding, an activating winding, and an output winding, means connecting said activating windings in series; means connecting said output windings in a network having a plurality of parallel paths and to the last of said series activating windings; load means connected in series with said output winding paths; means including an input winding for determining the magnetization of a core in one direction; and means for applying an activating pulse to said activating windings in series to determine the magnetization of said core in the other direction, said output windings being wound on said cores to develop a forward electromotive force thereacross during the reversal of the direction of magnetization of said priorly set core.

4. An electrical circuit in accordance with claim 3 further comprising unidirectional current elements connected within said output winding network and poled so as to allow only current from said activating pulse to flow therethrough.

5. An electrical circuit in accordance with claim 4 and further comprising a unidirectional current element connected in parallel with said output winding network, said element being poled so that said activating pulse flows through said last mentioned element after resetting of said priorly set core.

6. An electrical circuit comprising a magnetic core; an input winding, an activating winding and an output winding on said core, said activating winding having a larger number of turns than said output winding; means connecting said activating winding in series with said output winding; load means connected in series with said output winding; means including said input winding to determine the magnetization of said core in one direction; and means for applying an activating pulse to said activating winding to determine the magnetization of said core in the other direction, said output winding being wound on said core to develop an electromotive force thereacross to draw said activating pulse through said output winding to said load means during the determination of said magnetization in said other direction.

7. An electrical circuit in accordance with claim 6 further comprising a unidirectional current element connected across said output winding.

8. An electrical circuit comprising at least two magnetic cores each having an initial state of magnetization; a plurality of windings on each of said cores, said windings including an input winding, an activating winding and an output winding, said activating windings being connected in series and one end of each of said output windings being connected to the last of said series activating windings; load means individually connected to the other end of each of said output windings; means including said input winding for reversing the state of magnetization of one of said cores; and means for applying an activating pulse to said activating windings in series to restore the initial state of magnetization in said one core, said output windings being wound on each of said cores so that a forward electromotive force is induced therein during restoration of said initial state of magnetization and said activating pulse is applied only to the load means connected to the output windings of said one core.

9. An electrical circuit in accordance with claim 8 further comprising a unidirectional current element connected in series with each of said output windings and poled so as to prevent current flow therethrough due to an induced electromotive force in another of said output windings.

10. An electrical circuit comprising a plurality of magnetic cores alternately arranged in two groups, each of said cores including an input winding, an activating winding, and an output winding; a first activating pulse source; means connecting the activating windings of the first group of cores in series with said first pulse source and connecting one end of each of the output windings of the first group of cores to the last of said series connected activating windings; a second activating pulse source; means connecting the activating windings of the second group of cores in series with said second pulse source and connecting one end of each of the output windings of the second group of cores to the last of said series connected activating windings; and means connecting each output winding of each group of cores to an input winding of the other group of cores, said output windings being wound on said cores to develop a forward electromotive force thereacross during the reversal of the magnetization in said cores on application of said activating pulses.

11. An electrical circuit in accordance with claim 10 wherein the activating winding on each core has a larger number of turns than the output winding on that core.

12. An electrical circuit in accordance with claim 11 wherein said activating pulses are applied to said groups of windings alternately from said first and second pulse sources.

13. An electrical circuit in accordance with claim 12 and further comprising a unidirectional current element in series with each of said output windings and poled to prevent passage of current therethrough due solely to induced electromotive forces.

14. An electrical circuit in accordance with claim 13 and further comprising a unidirectional current element connected in parallel with each of said groups of output windings, said elements being poled so that said activating pulses flow through said last mentioned elements after reversal of magnetization in said cores.

15. An electrical circuit comprising a plurality of magnetic cores; a plurality of windings on each of said cores, said windings including an input winding, an activating winding, and an output winding, said activating widings havig a larger number of turns than said output windings; means connecting said output windings in a network comprising a plurality of electrical paths; load means connected to each of said paths; means including an input winding for determining the magnetization of certain of said cores in one direction, and means for applying an activating pulse to said activating windings in series to determine the magnetization of said certain cores in the other direction, said output windings being wound on said cores to develop a forward electromotive force thereacross during the reversal of the direction of magnetization of said certain cores whereby an output pulse flows only in the network path including output windings of said certain cores.

16. An electrical circuit comprising a plurality of magnetic cores; a plurality of windings on each of said cores, said windings including an input winding, an activating winding, and an output winding, means connecting said output windings in a network comprising a plurality of electrical paths; means including an input winding for determining the magnetization of certain of said cores in one direction; and means for simultaneously applying an activating pulse to said activating windings in series and to said network to determine the magnetization of said certain cores in the other direction, said output windings being wound on said cores to develop a forward electromotive force thereacross during reversal of the direction of magnetization of said certain cores whereby said applied pulse flows only in the network path including windings of said certain cores.

References Cited in the file of this patent

UNITED STATES PATENTS 2,681,181 Spencer ---------------- June 15, 1954

OTHER REFERENCES

"The Use of Magnetic Cores as Switching Devices," by R. C. Minnick, Harvard Univer. Computation Lab. Progress Report No. BL-3, April 1953.